March 24, 1936.    O. I. JUDELSHON    2,035,269
VARIABLE SPEED DRIVE
Filed June 28, 1935
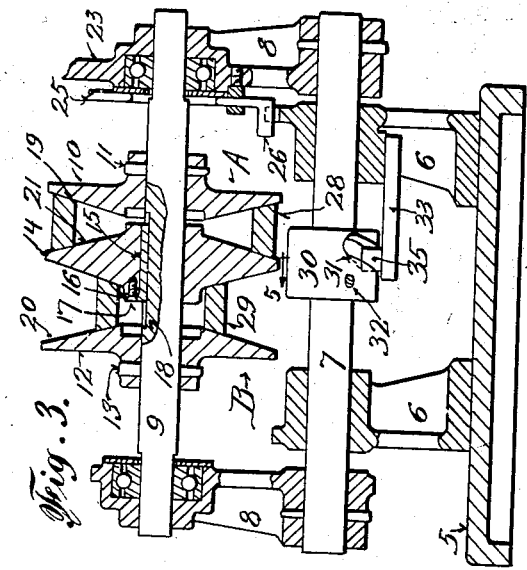
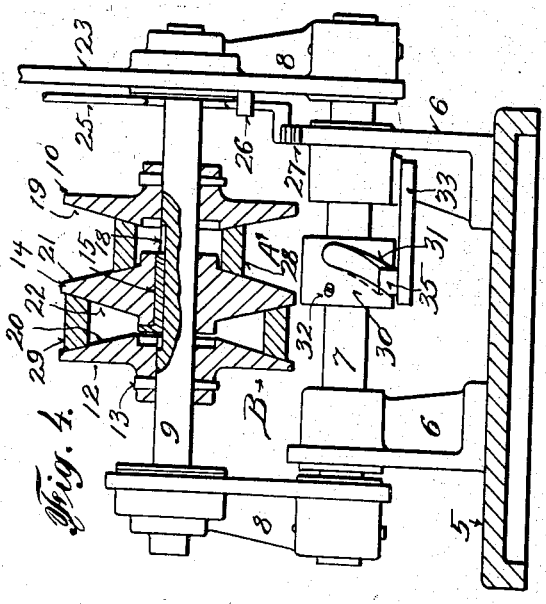
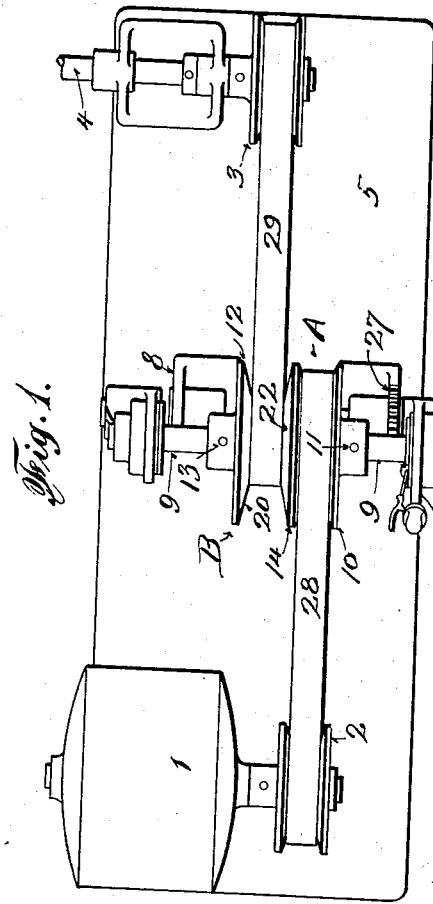
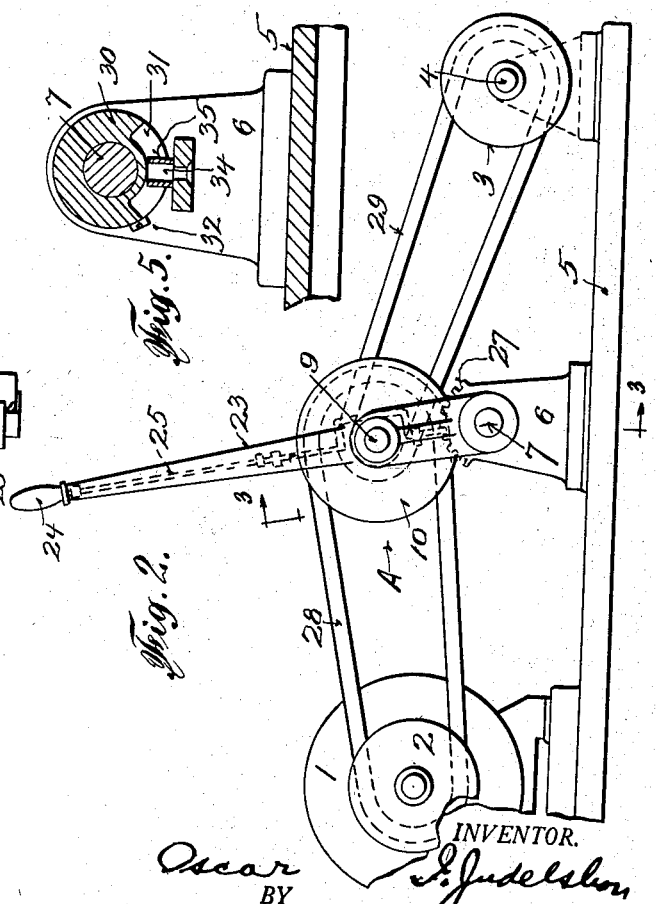
INVENTOR.
Oscar I. Judelshon
BY
Charles G. Hensley
ATTORNEY Patented Mar. 24, 1936

2,035,269

UNITED STATES PATENT OFFICE 2,035,269

VARIABLE SPEED DRIVE

Oscar I. Judelshon, Park Ridge, N. J.

Application June 28, 1935, Serial No. 28,796

10 Claims. (Cl. 74—230.17)

My invention relates to the type of variable speed drive or transmission which includes an endless member or belt which travels over a pulley, the flanges of which are relatively movable toward and from each other in order to vary the radius of the arc which the belt travels around the pulley to vary the speed ratio between the driving and driven members. In my co-pending application Serial No. 27,918 I have shown and described a variable speed drive having many of the characteristics of the present invention, but in that case I showed my invention embodied in a construction in which springs were employed to move the flanges of the expansible pulleys, although the claims in that application are not necessarily limited to a construction employing the springs. The general purposes of the present invention are similar to those of the invention disclosed in my said co-pending application but the present case discloses a construction wherein the springs may be eliminated and positive means may be employed for varying the flanges of the expansible pulleys to control changes in the speed ratio between the driving and driven members.

In one of the variable speed drives of the belt and pulley type now on the market an endless belt travels over two pulleys, each having a pair of flanges, the flanges of each pair being adjustable toward and from each other by means of a lever system, so that one pulley is in effect made smaller and vice versa, and by this method the speed ratio as between a driving and driven member is varied as desired.

The belt is of the V type to fit between the flanges of the pulleys as these have slanting or frusto conical opposed faces. While this former type of drive or transmission provided a very wide range of speed changes, the construction of the apparatus was expensive; it required considerable space; and the operation of the adjusting means required considerable force or it required considerable time to make the adjustment. The present invention forms a complete displacement of the former drive just described.

The drive or transmission containing my present invention is much less expensive to make for any particular duty to be performed; it is more compact and therefore it occupies less space, and it is adapted for attachment to all kinds of machinery and in various positions. The device permits of the widest speed variations, the operation of the speed change member requires but slight force, and there is a minimum of vibration and complete lack of noise during change from one speed to another. So little force is required to vary the speed ratio between the driving and driven members that the present device may be coupled with some machine which is driven by the device to make the speed change automatically with the requirements of the machine, thereby making the present drive applicable to many kinds of machines where former variable drives were not applicable.

The present drive may be employed for operating lathes, drill presses, shapers and planers, as well as innumerable other machines, because of the characteristics pointed out above, and also because the present drive is so inexpensive that when applied to the machines its cost will not be disproportionate with the total cost of the equipment. It may replace the ordinary stepped pulley drive in such machines. Where the present invention is used in its complete aspect, two expansible pulleys are formed side by side, and including a pair of outer flanges with a shiftable intermediate flange which is common to both pulleys.

Change in speed is effected by changing the position of the expansible pulleys and by simultaneously shifting the two outer flanges which causes an automatic shift of the intermediate or common flange. In the present case I show positive means for shifting the outer flanges of the expansible pulleys for changing the effective sizes of the expansible pulleys in order to change the speed ratio of the drive.

Other advantages will be set forth in the following detailed description of my invention.

In the drawing forming part of this application,

Figure 1 is a plan view of a variable drive embodying my invention,

Figure 2 is an elevation thereof,

Figure 3 is a sectional view taken on the line 3—3 of Figure 2,

Figure 4 is an end elevation of the variable drive with parts broken away and showing the parts in the opposite position to that in Figure 3, and Figure 5 is a sectional view taken on the line 5—5 of Figure 3.

In the drawing I have shown a motor 1 as the source of power although it is to be understood that any source of power may be used to operate the drive. I have shown the driving member as a grooved pulley 2, fixed on the shaft of the motor. The driven member is shown as a grooved pulley 3 mounted on a shaft 4 from which the power is taken for operating any kind of machine or apparatus requiring a variable drive. The motor is shown as mounted on a base 5 and the brackets 6 for supporting the shaft 7 in spaced relation to the motor are also shown as mounted on this base.

Between the motor and the shaft 4 I have shown mounted on the base a pair of spaced brackets 6 in which is journaled the shaft 7 which is adapted to shift axially in its bearings. On this shaft are fixed the upwardly extending and spaced lever arms 8 in which is journaled the shaft 9 which is adapted to be shifted axially with the lever arms 8 and with the shaft 7. On the shaft 9 are mounted members constituting the two expansible pulleys A and B.

The pulley A consists in part of a flange member 10 fixed to the shaft 9 as by a pin 11 extending through the hub of this pulley and the shaft. The pulley B consists in part of the flange member 12 which is fixed to the shaft as by a pin 13 passing through the hub of the flange member and the shaft.

There is an intermediate flange member 14 which is common to both pulleys A and B. This flange member is mounted to slide on the shaft 9 and is caused to revolve therewith by means of the key 15 inserted in a slot in the hub of the flange member, the key being shown as having an upturned end 16 which is secured against one end of the flange member by a screw 17. This key engages in the keyway 18 formed in the shaft 9.

The flange member 10 has a frusto conical face 19 and the flange member 12 has a frusto conical face 20 facing in the opposite direction to that of the face 19. The intermediate flange member 14 has one frusto conical surface 21 facing the frusto conical surface 19 of the flange member 10 and cooperating therewith to form a grooved pulley. The intermediate flange member also has a frusto conical face 22 facing toward the frusto conical face 20 of the flange member 12 and co-operating therewith to form the grooved pulley B.

I have shown one of the lever arms 8 extended upwardly to form a lever arm 23 having an operating handle 24 at its other end. There is a sliding member 25 secured in suitable bearings on the lever member 23 and the lever arm 8, and the lower end of this sliding member is turned at an angle as shown at 26 and is adapted to co-operate with the teeth of an arcuate rack 27 formed on the upper edge of one of the brackets 6 for the purpose of locking the lever arm 23 in various adjusted positions.

There is an endless belt 28 of the V type engaging around the driving member 2 and around the pulley A, through which belt the operating force is taken from the driving member 2 to operate the shaft 9 on which the expansible pulleys are mounted. One loop of this belt has its inclined side edges engaging between frusto conical surfaces 19 and 21 of one of the side flange members and the intermediate flange member.

There is another endless belt 29 of the V type which travels around the pulley B with its slanting side edges engaging the frusto conical surfaces 20 and 22 of the left flange member and the intermediate flange member. This belt also travels around the grooved pulley 3 on the shaft 4 from which power may be taken to operate any type of machine or apparatus.

I have provided means for shifting the shaft 9 axially co-incident with the swinging of this shaft into different positions by the swinging motion of the lever arms 8. For this purpose I have shown the cam 30 having a groove 31 extending at an angle to the axis of the shaft 7 this cam being mounted on the shaft 7 to oscillate therewith as by means of a set screw 32. There is an arm 33 secured to one of the brackets 6 and on the free end of this arm there is a stud 34 which carries an antifriction roller 35 which travels in the groove 31 of the cam.

Operation

In the operation of the present invention it is possible to retain both belts 28, 29 in straight lines or in other words the middle lines of these belts do not shift during changes of the speed ratio of the drive. This makes it possible to employ a grooved pulley for the driving member and a grooved pulley for the driven member to obtain maximum traction for driving heavy loads.

When the parts are in the position shown in Figure 3 the driven member 3 is operated at minimum speed because at such time the flange member 10 and the intermediate flange member 14 are relatively close together and the belt 28 is traversing a relatively large arc around the pulley A. The shaft 9 is therefore driven at a lower speed than the motor shaft and in the proportions illustrated in the drawing, because the driving pulley is smaller than the effective size of the pulley A it results in a reduction of speed as between the driving pulley 2 and the expansible pulley A. At this time the left flange member 12 is relatively far from the cooperating face of the intermediate flange member 14 so that the belt 29 is traversing a relatively small arc around the pulley B.

In the proportions shown in the drawing, at this time the effective size of the pulley B is smaller than the driven pulley 3 and therefore there is a further reduction in speed as between the shaft 9 and the shaft 4. During the condition shown in Figure 3 the lever arm 23 is thrown in a clockwise direction to a position where the locking member 26 engages the slot furthest to the left in the arcuate segment 27. In other words, the shaft 9 at this time is nearest the driving pulley and farther from the driven pulley. At such time also, the shaft 7 is in its farthest left hand position as shown in Figure 3 and therefore the shaft 9 and the lever arms 8 are in their extreme left hand position.

Let it be assumed that the parts are to be shifted into a position which will increase the speed ratio between the driving and driven members. To do this the locking member 26 is released from the sector 27 and the lever arm 23 is moved clockwise as viewed in Figure 2, whereupon the locking member is allowed to reengage the sector 27 to lock the parts in the adjusted position.

While the lever arm 23 is thus being rocked clockwise in Figure 2, the following actions take place. The shaft 7 is moved with the lever arms 8 and the shaft 9 and this moves the shaft 9 from its position nearest the driving pulley and to a point nearer the driven pulley. At the same time the shaft 7 is shifted axially by the co-operative action of the cam 30 and the stationarily mounted roller 35 from the left hand position in Figure 3 to the right hand position shown in Figure 4. This shifts both of the flange members 10, 12 from left to right, a short distance to avoid the lateral shifting of the belts.

At the same time the floating or intermediate flange member 14 shifts slightly from left to right and alters the distance between this flange member and the two end flange members. This causes the effective size of the pulley A to be reduced so that the arc travelled by the belt 28 around the pulley A is reduced as shown in Figure 4 and the arc traveled by the belt 29 around the pulley B is increased as shown in Figure 4.

It will be understood that the shifting of the lever arm 23 takes place while both belts are in operation as the change in the effective sizes of the pulley must take place while the belts are running.

The intermediate flange member 14 is not directly shifted by the axial movement of the shaft 9 but indirectly through the change of the arcs of the belts.

In other words, the position of this intermediate member is changed by the action of the belts in co-operation with the two end flange members. The distance between the end flange members does not change but their position is shifted with the shifting of the shaft 9.

When the parts are in the position shown in Figure 4 the effective size of the pulley A will have been decreased because the end flange member 10 and the intermediate flange member 14 are spaced relatively far apart so that the loop of the belt 28 travelling around the pulley A is a relatively small arc and the driving member will therefore operate through the pulley A and belt 28 to drive the shaft 9 at a relatively high speed. On the other hand, the flange member 12 and the intermediate flange member 14 are at this time relatively close to each other so that the belt 29 travels in a relatively large arc around the pulley B so that there is a further increase of speed as between the shaft 9 and the driven pulley 3.

From what has been said, it will be apparent that as the effective size of the pulley A grows smaller the effective size of the pulley B grows larger in direct accordance with the movement of the shaft 9 in relation to the driving and driven members. The speed ratio between the driving pulley and the driven pulley will be at maximum when the parts are in the position shown in Figure 4. As between the condition shown in Figures 3 and 4 there may be any variation in the ratio as between the driving and driven members, depending upon the position of the lever 23.

By positively moving the flange members 10, 12 at the same time that the shaft 9 is shifted by the rocking of the arms 8 I am enabled to use positive means for shifting the flanges of the expansible pulleys and to eliminate the use of springs which are shown in my co-pending application. In many cases it is preferable to avoid the use of the springs, whereas in other instances the springs may be desirable.

It will be obvious that it is not necessary to shift the shaft 9 at right angles to its axis on swinging arms as direct reciprocating motion may be employed, although the swinging arms provide very simple construction. It is not necessary to employ a particular type of cam for shifting the shaft 8 axially but it is desirable, if not absolutely necessary, that the shaft 9 be shifted axially at the same time and in synchronism with the shifting of the shaft 9 in relation to the driving and driven members.

If the belts, through wear or stretch, become slack, the motor 1 may be shifted on its base in accordance with common practice and this will simultaneously tighten both belts 28 and 29.

Having described my invention, what I claim is:

1. In a device of the character described, a driving pulley, a driven pulley, a plurality of endless belts of the V type travelling respectively around said driving and driven pulleys, a shaft, a plurality of expansible pulleys of the V type on said shaft, including end flange members and an intermediate flange member common to both expansible pulleys, means for fixing the distance between said end flange members, said intermediate flange member floating between the end flange members, and means for axially shifting said end flange members to vary the effective sizes of said expansible pulleys in reverse order, said belts travelling respectively around said expansible pulleys.

2. In a device of the character described, a driving pulley, a driven pulley, a plurality of endless belts of the V type travelling respectively around said driving and driven pulleys, a shaft, a plurality of expansible pulleys of the V type on said shaft, including end flange members fixed to said shaft at a fixed distance apart to revolve therewith, and an intermediate flange member common to both expansible pulleys, said intermediate flange member connected to revolve with said shaft but slidable along the same to float between the end flange members, and means for axially shifting said end flange members to vary the effective sizes of said expansible pulleys in reverse order, said belts travelling respectively around said expansible pulleys.

3. In a device of the character described, a driving pulley, a driven pulley, a plurality of endless belts of the V type travelling respectively around said driving and driven pulleys, a shaft, a plurality of expansible pulleys of the V type on said shaft, including end flange members fixed to said shaft at a fixed distance from each other to revolve therewith, and an intermediate flange member common to both expansible pulleys, said intermediate flange member connected to revolve with said shaft and slidable along the same to float between said end flange members, means for axially shifting said shaft and with it said end flange members, to vary the effective sizes of said expansible pulleys in reverse order, said belts travelling respectively around said expansible pulleys.

4. In a device of the character described, a driving pulley, a driven pulley, a plurality of endless belts of the V type travelling respectively around said driving and driven pulleys, a shaft, a plurality of expansible pulleys of the V type on said shaft, including end flange members and an intermediate flange member common to both expansible pulleys, means for fixing the distance between said end flange members, said intermediate flange member floating between the end flange members but revolving with said shaft, means for axially shifting said end flange members to vary the effective sizes of said expansible pulleys in reverse order, said belts traveling respectively around said expansible pulleys, and means for shifting said shaft at an angle to its axis for the purpose described.

5. In a device of the character described, a driving pulley, a driven pulley, a plurality of endless belts of the V type travelling respectively around said driving and driven pulleys, a shaft, a plurality of expansible pulleys of the V type on said shaft, including end flange members fixed to said shaft to revolve therewith, and fixed in spaced relation to each other, and an intermediate flange member common to both expansible pulleys, said intermediate flange member connected with and revolvable with said shaft, and slidable along the same to float between said end flange members, means for axially shifting said shaft, said belts travelling respectively around said expansible pulleys, and means to shift said shaft at an angle to its axis for the purpose described.

6. In a device of the character described, a driving pulley, a driven pulley, a plurality of endless belts of the V type travelling respectively around said driving and driven pulleys, a shaft, a plurality of expansible pulleys of the V type on said shaft, including end flange members fixed to said shaft to revolve therewith, and an intermediate flange member common to both expansible pulleys, said intermediate flange member connected to revolve with said shaft but slidable along the same to float between the end flange members, means for axially shifting said shaft to vary the effective sizes of said expansible pulleys in reverse order, said belts travelling respectively around said expansible pulleys, and means for shifting said shaft at an angle to its axis simultaneously with the axial shifting of said shaft.

7. In a device of the character described, a driving pulley, a driven pulley, a plurality of endless belts of the V type travelling respectively around said driving and driven pulleys, a shaft, a plurality of expansible pulleys of the V type on said shaft, including end flange members fixed to said shaft to revolve therewith, and an intermediate flange member connected to revolve with said shaft but slidable along the same to float between the end flange members, means for axially shifting said shaft to vary the effective sizes of said expansible pulleys in reverse order, said belts travelling respectively around said expansible pulleys, and means for shifting said shaft at an angle to its axis simultaneously and in synchronism with the axial shifting of said shaft.

8. In a device of the character described, a driving pulley, a driven pulley, a plurality of endless belts of the V type travelling respectively around said driving and driven pulleys, a shaft, a plurality of expansible pulleys of the V type on said shaft, including end flange members and an intermediate flange member common to both expansible pulleys connected to revolve with said shaft but slidable along the same to float between the end flange members, means for axially shifting said flange members to vary the effective sizes of said expansible pulleys in reverse order and means for locking said shifting means in various adjusted positions, said belts travelling respectively around said expansible pulleys.

9. In a device of the character described, a driving pulley, a driven pulley, a plurality of endless belts of the V type travelling respectively around said driving and driven pulleys, rocking supports, a shaft carried by said rocking supports, a plurality of expansible pulleys of the V type on said shaft, including end flange members fixed to revolve with said shaft, and an intermediate flange member common to both expansible pulleys connected to revolve with said shaft but slidable along the same to float between the end flange members, said belts travelling respectively around said expansible pulleys, means for rocking said supports to shift the position of said shaft and means for axially shifting said shaft simultaneously therewith to vary the effective sizes of said expansible pulleys in reverse order.

10. In a device of the character described, a driving pulley, a driven pulley, a plurality of endless belts of the V type travelling respectively around said driving and driven pulleys, a shaft having a cam and means co-operating therewith to shift said shaft axially when the same is oscillated, rocking supports carried by said shaft, a second shaft mounted on said rocking supports to be moved in relation to said driving and driven members, a plurality of expansible pulleys of the V type on said second shaft including end flange members fixed to the shaft, and an intermediate flange member common to both expansible pulleys and connected to revolve with said shaft but slidable along the same to float between the end flange members, and means for rocking said first shaft to vary the spacing of said second shaft in relation to the driving and driven pulleys, and to shift said second shaft axially to vary the effective sizes of said expansible pulleys in reverse order, said belts travelling respectively around said expansible pulleys.

OSCAR I. JUDELSHON.